(12) United States Patent
Cheng et al.

(10) Patent No.: US 11,076,138 B2
(45) Date of Patent: Jul. 27, 2021

(54) PROJECTION SYSTEM, PROJECTION APPARATUS AND CALIBRATING METHOD FOR DISPLAYED IMAGE THEREOF

(71) Applicant: Coretronic Corporation, Hsin-Chu (RW)

(72) Inventors: Je-Fu Cheng, Hsin-Chu (TW); Lei-Chih Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/872,382

(22) Filed: May 12, 2020

(65) Prior Publication Data
US 2020/0366877 A1 Nov. 19, 2020

(30) Foreign Application Priority Data
May 13, 2019 (CN) .......................... 201910393297.5

(51) Int. Cl.
*H04N 9/31* (2006.01)
(52) U.S. Cl.
CPC ......... *H04N 9/3194* (2013.01); *H04N 9/3185* (2013.01)
(58) Field of Classification Search
CPC .. H04N 13/246; H04N 9/3185; H04N 9/3194; G06T 7/85
See application file for complete search history.

(56) References Cited

U.S. PATENT DOCUMENTS 10,440,338 B2 * 10/2019 Chen .................... H04N 9/3188
10,798,353 B2 * 10/2020 Matsuzawa ............... G06T 7/70
(Continued)

FOREIGN PATENT DOCUMENTS

TW 201351391 12/2013
TW 201611616 3/2016
(Continued)

OTHER PUBLICATIONS

"Office Action of Taiwan Counterpart Application", dated Jun. 20, 2020, p. 1-p. 10.

*Primary Examiner* — Paulos M Natnael
(74) *Attorney, Agent, or Firm* — JCIPRNET (57) ABSTRACT

Provided are a projection system, a projection apparatus, and a calibration method for a displayed image thereof. The calibration method includes: by a projection apparatus, projecting a calibration image to form an imaged image, wherein the calibration image has at least four identification patterns; by an image capturing apparatus, providing multi-axis angle information, and capturing a captured image including the imaged image; by an arithmetic device, calculating a reference region range in the captured image according to the multi-axis angle information, and calculating coordinate conversion information according to the identification patterns of the calibration image and identification patterns in the captured image; by the arithmetic device, calculating boundary calibration information according to reference coordinate values on the reference region range and the coordinate conversion information; and by the projection apparatus, adjusting the size of the imaged image according to the boundary calibration information and the coordinate conversion information.

20 Claims, 8 Drawing Sheets

(56) References Cited

U.S. PATENT DOCUMENTS

| | | | | |
|---|---|---|---|---|
| 2008/0031514 A1* | 2/2008 | Kakinami | .................. | G06T 7/80 |
| | | | | 382/154 |
| 2008/0186384 A1* | 8/2008 | Ishii | ..................... | H04N 17/002 |
| | | | | 348/187 |
| 2008/0231710 A1* | 9/2008 | Asari | ................... | H04N 17/002 |
| | | | | 348/187 |
| 2013/0247117 A1* | 9/2013 | Yamada | ............... | H04B 5/0031 |
| | | | | 725/93 |
| 2014/0002610 A1* | 1/2014 | Xi | ...................... | G01B 11/2545 |
| | | | | 348/46 |

FOREIGN PATENT DOCUMENTS

| | | |
|---|---|---|
| TW | I637230 | 10/2018 |
| TW | 201905573 | 2/2019 |

\* cited by examiner

PROJECTION SYSTEM, PROJECTION APPARATUS AND CALIBRATING METHOD FOR DISPLAYED IMAGE THEREOF

CROSS-REFERENCE TO RELATED APPLICATION

This application claims the priority benefit of China application serial no. 201910393297.5, filed on May 13, 2019. The entirety of the above-mentioned patent application is hereby incorporated by reference herein and made a part of this specification.

BACKGROUND OF THE INVENTION

1. Field of the Invention

The invention relates to a projection system, a projection apparatus, and a calibration method for a displayed image thereof, and particularly relates to a projection system, a projection apparatus, and a calibration method for a displayed image thereof capable of automatically calibrating an imaged image.

2. Description of Related Art

In the known projection systems, a projection apparatus may project a projection beam onto a projection curtain to form an image. However, imaged images projected by a projection apparatus without calibration are not necessarily displayed completely on the projection curtain, and the imaged images are not necessarily presented in a correct shape (rectangular shape). Therefore, the user needs to manually make adjustments in at least four directions for the projection apparatus in order to calibrate the imaged image.

Meanwhile, in the conventional technology, the image of a special structure of the projection curtain may be used as the basis of an auto-calibration mechanism. However, in the environment in which the projection system is used, it is often that the projection curtain cannot be installed, or the boundary of the projection curtain cannot be identified in the captured image generated for the projection curtain. Under these circumstances, the accuracy of the auto-calibration mechanism for images may drop significantly.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection apparatus, a projection system, and a calibration method for a displayed image thereof capable of calibrating an imaged image that is generated.

In order to achieve one or a portion of or all of the objects or other objects, an embodiment of the invention provides a calibration method for a displayed image, and the calibration method is suitable for a projection system. The projection system includes a projection apparatus, an image capturing apparatus, and an arithmetic device. The calibration method includes: by a projection apparatus, projecting a calibration image as an imaged image, wherein the calibration image has at least four identification patterns; by an image capturing apparatus, providing multi-axis angle information, and capturing a captured image including the imaged image; by an arithmetic device, calculating a reference region range in the captured image according to the multi-axis angle information, and calculating coordinate conversion information according to the identification patterns in the calibration image and identification patterns in the captured image; by the arithmetic device, calculating boundary calibration information according to reference coordinate values of the reference region range and the coordinate conversion information; and by the projection apparatus, adjusting the size of the imaged image according to the boundary calibration information and the coordinate conversion information.

In order to achieve one or a portion of or all of the objects or other objects, a projection system according to an embodiment of the invention includes a projection apparatus, an image capturing apparatus, and an arithmetic device. The projection apparatus projects a calibration image as an imaged image, and adjusts a size of the imaged image according to boundary calibration information and coordinate conversion information. The calibration image has at least four identification patterns. The image capturing apparatus provides multi-axis angle information and captures a captured image including an imaged image. The arithmetic device is coupled to the projection apparatus and the image capturing apparatus, calculates a reference region range in the captured image according to the multi-axis angle information, and calculates the boundary calibration information according to a plurality of reference coordinate values of the reference region range and the coordinate conversion information. The arithmetic device calculates the reference region range according to the multi-axis angle information. The arithmetic device further calculates the coordinate conversion information according to the identification patterns of the calibration image and a plurality of identification patterns of the captured image.

In order to achieve one or a portion of or all of the objects or other objects, a projection apparatus according to an embodiment of the invention includes an image capturing apparatus and an arithmetic device. The image capturing apparatus provides multi-axis angle information and captures a captured image including an imaged image. The arithmetic device is coupled to the image capturing apparatus, controls a projection lens to project a calibration image as the imaged image, and adjusts a size of the imaged image according to boundary calibration information and coordinate conversion information. The calibration image has at least four identification patterns. The arithmetic device calculates the boundary calibration information according to a plurality of reference coordinate values of the reference region range and the coordinate conversion information. The arithmetic device calculates the reference region range according to the multi-axis angle information. The arithmetic device calculates the coordinate conversion information according to the identification patterns of the calibration image and a plurality of identification patterns of the captured image.

Based on the above, in the embodiments of the invention, the image capturing apparatus captures the imaged image generated by the projection apparatus according to the calibration image, and obtains the captured image. The arithmetic device calculates the coordinate conversion information according to the identification patterns of the calibration image and the identification patterns of the captured image. The arithmetic device generates the reference region range according to the multi-axis angle information according to the image capturing apparatus. The arithmetic device further calculates the boundary calibration information according to the reference coordinate values of the reference region range and the coordinate conversion information. In this way, the projection apparatus may adjust the size of the imaged image according to the boundary calibration information and the coordinate conversion information, so as to adjust the imaged image. The embodiments of the invention do not require a projection curtain as the basis of adjustment, and are capable of making the projection system more convenient to use and increasing the accuracy of the adjustment to the imaged image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
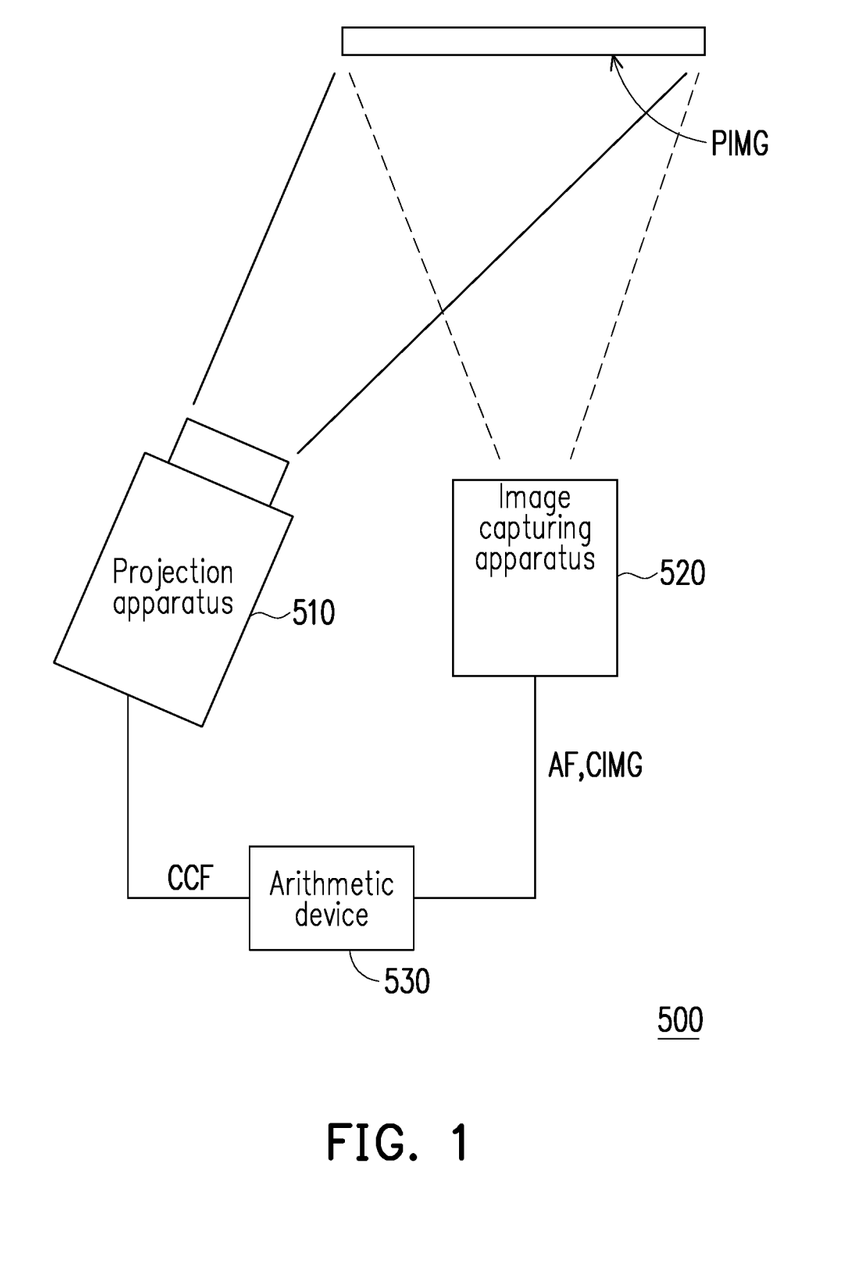
FIG. 1 is a schematic view illustrating a projection system according to an embodiment of the invention.

Referring to FIG. 1, FIG. 1 is a schematic view illustrating a projection system according to an embodiment of the invention. A projection system 500 includes a projection apparatus 510, an image capturing apparatus 520, and an arithmetic device 530. The projection apparatus 510 projects a calibration image on a projection target to serve as an imaged image PIMG. The image capturing apparatus 520 is configured to capture the imaged image PIMG to obtain a captured image CIMG. The image capturing apparatus 520 has a multi-axis angle detector for generating multi-axis angle information AF according to a static gravity state of the image capturing apparatus 520. The multi-axis angle detector may be, for example, a gravity sensor, a magnetic sensor, or any sensor well known by people having ordinary skill in the art for being able to sense a horizontal inclination angle of an apparatus. The invention does not intend to impose a limitation on this regard. The projection apparatus 510 is a projector, for example, the image capturing apparatus 520 is a camera, for example, and the projection target is a projection screen or a wall, for example.

In the embodiment, the arithmetic device 530 is coupled (electrically connected) to the projection apparatus 510 and the image capturing apparatus 520. The image capturing apparatus 520 transmits the multi-axis angle information AF and relevant information of the captured image CIMG to the arithmetic device 530. The arithmetic device 530 calculates a reference region range in the captured image CIMG according to the multi-axis angle information AF. The arithmetic device 530 calculates coordinate conversion information according to identification patterns of the calibration image and identification patterns in the captured image CIMG, and calculates boundary calibration information CCF according to a plurality of reference coordinate values of the reference region range and the coordinate conversion information. The arithmetic device 530 transmits the boundary calibration information CCF to the projection apparatus 510, so that the projection apparatus 510 adjusts the size and the shape of the imaged image PIMG to be projected according to the boundary calibration information CCF.

Figure 2:
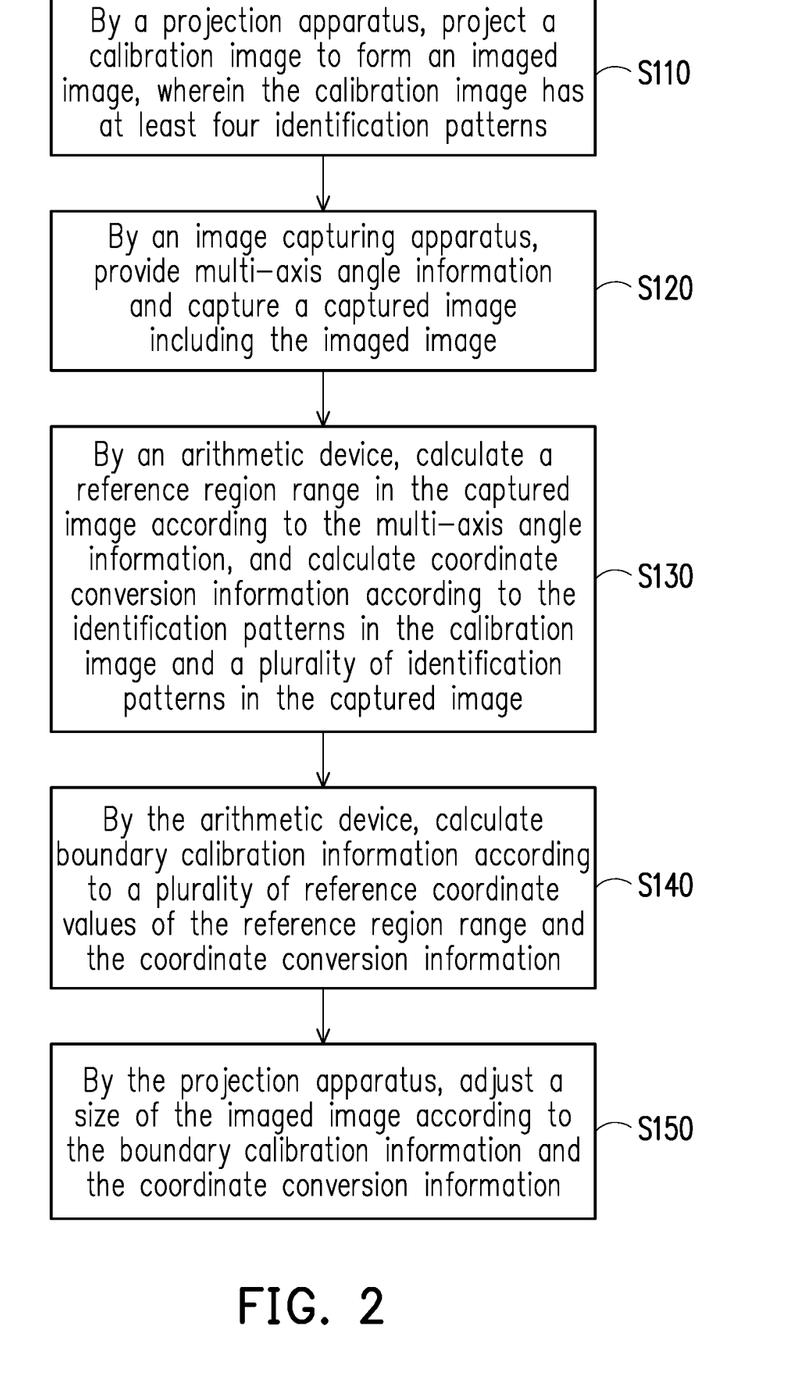
FIG. 2 is a flowchart illustrating a calibration method for a displayed image according to an embodiment of the invention.
Figure 3:
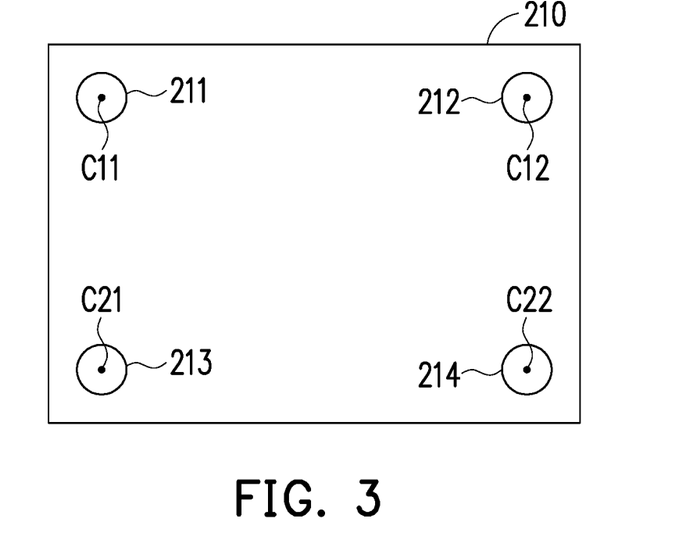
FIG. 3 is a schematic view illustrating a calibration image according to an embodiment of the invention.

Referring to FIG. 2, FIG. 2 is a flowchart illustrating a calibration method for a displayed image according to an embodiment of the invention. The calibration method for a displayed image shown in FIG. 2 is suitable for the projection system 500. In FIG. 2, at Step S110, the projection apparatus 510 projects a calibration image onto the projection target to form a imaged image PIMG. The calibration image has at least four identification patterns. Referring to FIGS. 2 and 3, FIG. 3 is a schematic view illustrating a calibration image 210 according to an embodiment of the invention. The calibration image 210 may be set (stored) in advance and stored in a storage apparatus of the projection apparatus 510. The storage apparatus is, for example, a memory device, etc. The calibration image 210 may include at least four identification patterns 211 to 214. The identification patterns 211 to 214 respectively have a plurality of geometric centers C11, C12, C21 and C22. The projection apparatus 510 projects the calibration image 210 to generate the imaged image PIMG. Therefore, the imaged image PIMG may also include at least four identification patterns 211 to 214. However, due to relative positions between the projection apparatus 510 and the projection target, the imaged image PIMG may be skewed. For example, the calibration image 210 may be rectangular in default, and the identification patterns 211 to 214 in the calibration image are disposed at the four corners of the rectangle. In other words, the identification patterns 211 to 214 are respectively disposed at the four corners of the calibration image. After being projected onto the projection target by the projection apparatus 510, the four corners of the imaged image PIMG also include identification patterns 211' to 214', but the imaged image PIMG may be in a skewed trapezoid shape. In an embodiment, the calibration image may be in the default rectangular shape and have a pattern, such as a chessboard-like pattern or a pattern of irregularly distributed spots, and the identification patterns may be image features at specific positions in the pattern. In an embodiment, the geometric centers C11, C12, C21, and C22 may not be the geometric centers, but may be image features of any form in the calibration image, such as the vertices of the rectangle, etc.

Meanwhile, relative to the identification patterns 211 to 214, the calibration image 210 may also have a background pattern, and the identification patterns 211 to 214 have a relatively high contrast with respect to the background pattern, such as a black and white pattern.

Figure 4:
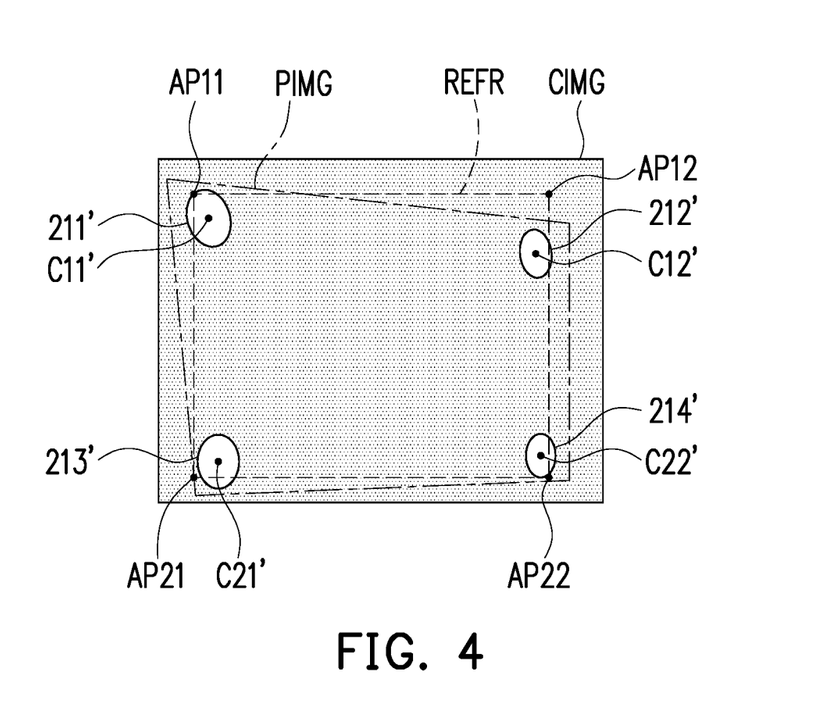
FIG. 4 is a schematic view illustrating a captured image captured by an image capturing apparatus according to an embodiment of the invention.

Then, at Step S120, the image capturing apparatus 520 provides multi-axis angle information AF and captures a captured image CIMG including the imaged image PIMG generated from the calibration image 210 projected by the projection apparatus 510. Referring to FIGS. 2 and 4, FIG. 4 is a schematic view illustrating the captured image CIMG captured by the image capturing apparatus 520 according to an embodiment of the invention. The image capturing apparatus 520 may be, for example, a handheld electronic apparatus (e.g., a smartphone), but the invention is not limited thereto. In addition, the image capturing apparatus 520 may perform an image capturing operation on the imaged image PIMG to obtain the captured image CIMG. The captured image CIMG includes the imaged image PIMG. In addition, the imaged image PIMG has the identification patterns 211' to 214', and the identification patterns 211' to 214' respectively have a plurality of geometric centers C11', C12', C21', and C22'. In an embodiment, C11', C12' C21' and C22' may not be the geometric centers, but may be image features corresponding to image features of any form in the calibration image. In addition, the image capturing apparatus 510 has a multi-axis angle detector for generating the multi-axis angle information AF under a static gravity state of the image capturing apparatus 520.

Referring to FIGS. 1 and 4, at Step S130, the arithmetic device 530 calculates a reference region range REFR in the captured image according to the multi-axis angle information AF. The arithmetic device 530 further calculates coordinate conversion information according to the identification patterns in the calibration image and the identification patterns 211' to 214' in the captured image CIMG. The maximum range and the minimum range of the reference region range REFR are associated with the hardware specification of the projection apparatus 510, such as the projection range thereof. For example, the maximum range of the region range REFR does not exceed the maximum projection area of the projection apparatus 510.

At Step S140, the arithmetic device 530 calculates a boundary calibration information CCF according to a plurality of reference coordinate values on the reference region range REFR and the coordinate conversion information. Here, the reference coordinate values on the reference region range REFR may be generated according to a plurality of corners of the reference region range REFR. Taking an example in which the reference region range REFR is rectangular, the reference coordinate values of the reference region range REFR may be the coordinate values of four vertices AP11, AP12, AP21, and AP22 of the reference region range REFR.

More specifically, the arithmetic device 530 may establish first coordinate information according to the identification patterns 211 to 214 of the calibration image provided by the projection apparatus 510, establish second coordinate information according to the identification patterns 211' to 214' in the captured image CIMG, and calculate the coordinate conversion information according to the first coordinate information and the second coordinate information. In another embodiment of the invention, the arithmetic device 530 may establish the first coordinate information according to the geometric centers C11, C12, C21, and C22 of the identification patterns 211 to 214 of the calibration image 210 and establish the second coordinate information according to the geometric centers C11', C12', C21, and C22' of the identification patterns 211' to 214' of the captured image CIMG.

It should be noted that the shapes of the identification patterns 211 to 214 of the calibration image and the identification patterns 211' to 214' in the captured image CIMG are not necessarily circular. In other embodiments of the invention, the identification patterns 211 to 214 and the identification patterns 211' to 214' may also be in other shapes. Besides, it is also unnecessary for the arithmetic device 530 to establish the first coordinate information and the second coordinate information respectively according to the identification patterns 211 to 214 and the identification patterns 211' to 214'. In other embodiments of the invention, the arithmetic device 530 may set a reference point for any position in each of the identification patterns 211 to 214 and each of the identification patterns 211' to 214', and establish the first coordinate information and the second coordinate information according to the coordinate values of the reference points.

Accordingly, the arithmetic device 530 may calculate the coordinate conversion information between a first coordinate system and a second coordinate system according to the first coordinate information of the identification patterns 211 to 214 of the calibration image in the first coordinate system and the second coordinate information of the identification patterns 211' to 214' in the captured image CIMG.

In the following, how Steps S130 and S140 are implemented are described with specific numerical values. However, the following values and the calculation method are merely described for an illustrative purpose and shall not be construed as a limitation on the invention.

It is assumed that the coordinate values of the geometric centers C11, C12, C21, and C22 of the identification patterns 211 to 214 in the first coordinate system are respectively (538, 786), (2600, 709), (530, 1779), and (2687, 1683), and the coordinate values of the geometric centers C11', C12', C21', and C22' of the identification patterns 211' to 214' in the captured image CIMG in the second coordinate system are respectively (260, 203), (1674, 203), (260, 890), and (1674, 890), and the coordinate conversion information between the first coordinate system and the second coordinate system, such as a matrix, is calculated, such as the following:

$$\begin{bmatrix} 0.674321 & 0.025942 & 0 & -0.000005 \\ 0.017670 & 0.733943 & 0 & 0.000047 \\ 0 & 0 & 1 & 0 \\ -116.673432 & -387.835892 & 0 & 0.965977 \end{bmatrix}$$

Regarding the calculation of the boundary calibration information CCF, in terms of operational details, the arithmetic device 530 generates the reference region range REFR according to the multi-axis angle information AF provided by the image capturing apparatus 520, and calculates the coordinate values of the four vertices AP11, AP12, AP21, and AP22 of the reference region range REFR in the second coordinate system. The arithmetic device 530 also substitutes the coordinate values of the four vertices AP11, AP12, AP21, and AP22 of the reference region range REFR in the second coordinate system into the coordinate conversion information to perform calculation, thereby obtaining the boundary information of the four vertices AP11, AP12, AP21, and AP22 of the reference region range REFR in the first coordinate system. In the embodiment, the coordinate values of the four corners of the reference region range REFR in the first coordinate system may be obtained. In an embodiment, the multi-axis angle information may serve to calibrate the second coordinates, particularly the skewness of the captured image CIMG resulting from the inclination angle of the image capturing apparatus 520 with respect to the ground surface.

For example, when the coordinate values of the four corners AP11, AP12, AP21, and AP22 of the reference region range REFR are respectively (300, 561), (2794, 466), (346, 1979), and (2862, 1852), by performing calculation (such as multiplication) on the respective coordinate values of the corners AP11, AP12, AP21, and AP22 with the coordinate conversion information, it may be calculated that the coordinate values of the four corners of the reference region range REFR in the first coordinate system are respectively (96, 32), (1826, 27), (143, 1016), and (1779, 1008).

After obtaining the boundary calibration information CCF of the reference region range REFR in the first coordinate system, the projection apparatus 520 may perform an image pre-processing operation on the imaged image to be projected subsequently according to the boundary calibration information CCF, and adjust the size of the projected image through image processing, so as to generate adjusted image data and generate an adjusted imaged image. The image processing includes processes for identifying or determining coordinate information of an object in an image and adjusting a displayed size of an image through relevant software or an image processing circuit.

It should be noted that, when generating the reference region range REFR, in addition to referring to the multi-axis angle information of the image capturing apparatus, the arithmetic device 530 may also adjust at least one of the position and the size of the reference region range REFR according to the positions of the identification patterns 211' to 214' in the captured image CIMG. In addition, the arithmetic device may allow the distances of the four vertices AP11, AP12, AP21, and AP22 with respect to the respectively corresponding identification patterns 211' to 214' in the reference region range REFR to be within a suitable distance range, so as to facilitate the accuracy of the boundary calibration information CCF.

Figure 5:
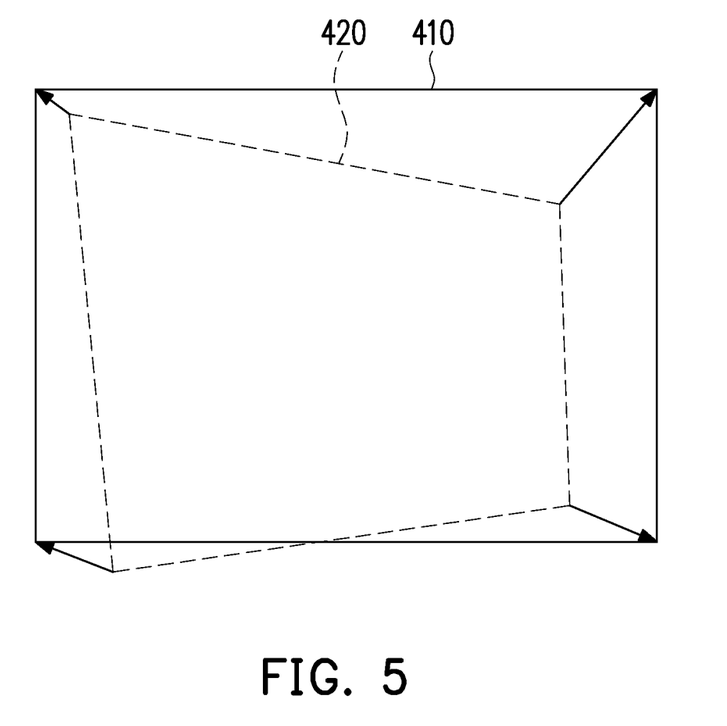
FIG. 5 is a schematic view illustrating a size adjustment operation on an imaged image according to an embodiment of the invention.

Referring to FIG. 5, FIG. 5 is a schematic view illustrating a size adjustment operation on an imaged image according to an embodiment of the invention. In FIG. 5, an imaged image 420 (i.e., the imaged image PIMG without calibration) generated by the projection apparatus is not in the default rectangular shape (i.e., in a non-ideal irregular rectangular shape), and the size of the imaged image 420 is not the default size. Here, by performing Step S150, the projection apparatus, adjusting a size of the imaged image according to the boundary calibration information and the coordinate conversion information. That is, the original size of the image data of the imaged image 420 may be adjusted/compensated (locally enlarged or shrunk), so as to obtain an adjusted imaged image 410 (i.e., the calibrated imaged image PIMG), thereby making the shape of the adjusted imaged image 410 the default rectangular shape and the size of the adjusted imaged image 410 the default size. In the embodiment, the shape and the size of the adjusted imaged image 410 are generated according to the reference region range REFR.

Of course, the size of the imaged image 420 may also be adjusted by globally enlarging or shrinking the original size of the imaged image 420. In addition, the aforementioned image size adjustment does not require to equally adjust each side of the imaged image 420, but is to make size adjustments in correspondence with the four sides (four corners) of the reference region range REFR.

As shown in FIG. 1, the operational details of the projection apparatus 510, the image capturing apparatus 520, and the arithmetic device 530 have been described in the foregoing embodiments and examples, and details in this regard will not be repeated in the following.

Referring to FIG. 1, regarding the hardware framework of the projection system 500, the projection apparatus 510 may be a projector of any form, such as a DLP projector, a liquid crystal projector, etc., and the image capturing apparatus 520 may be an electronic apparatus of any form capable of capturing an image, such as a camera or a video camera, etc. The arithmetic device 530 may be a processor having a computing capability. Alternatively, the arithmetic device 530 may be a hardware circuit designed based on the hardware description language (HDL) or other digital circuit design means with which people having ordinary skill in the art are familiar. The arithmetic device 530, as a hardware circuit, may be realized as a field programmable gate array (FPGA), a complex programmable logic device (CPLD), or an application-specific integrated circuit (ASIC).

Figure 6:
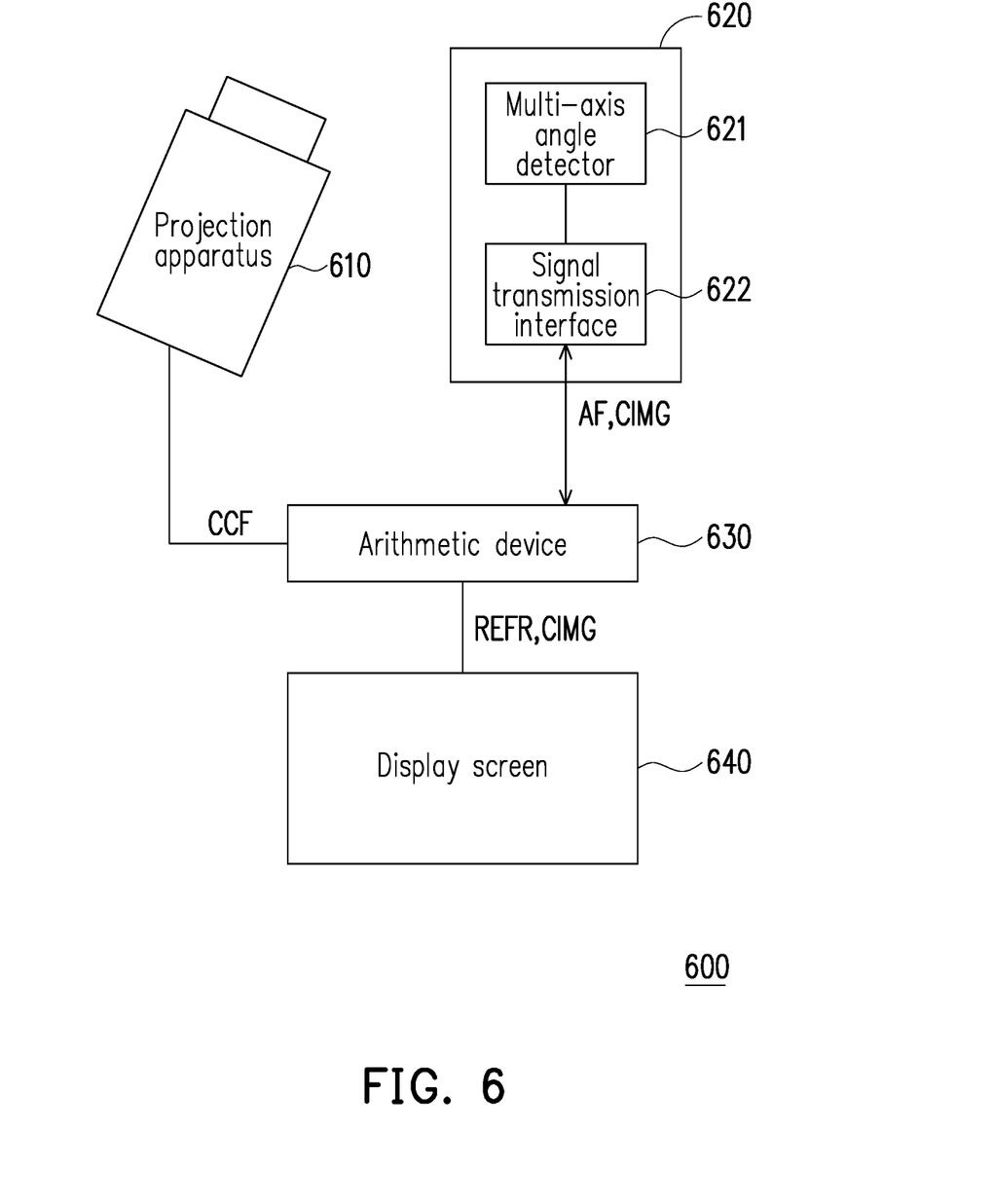
FIG. 6 is a schematic view illustrating a projection system according to an embodiment of the invention.

Referring to FIG. 6, FIG. 6 is a schematic view illustrating a projection system 600 according to an embodiment of the invention. A projection system 600 includes a projection apparatus 610, an image capturing apparatus 620, an arithmetic device 630, and a display screen 640. In the embodiment, the image capturing apparatus 620 includes a multi-axis angle detector 621 and a signal transmission interface 622. The image capturing apparatus 620 may obtain the multi-axis angle information AF through the multi-axis angle detector 621. The multi-axis angle information AF may include information such as horizontal inclination angle, etc., and the multi-axis angle detector 621 is, for example, a gravity sensor, a magnetic sensor, etc. The image capturing apparatus 620 may perform a signal transmission operation with the arithmetic device 630 through the signal transmission interface 622. In the embodiments of the invention, the image capturing apparatus 620 may also perform a signal transmission operation with the projection apparatus 610 through the signal transmission interface 622. The signal transmission interface 622 may be a wireless signal transmission interface, such as Bluetooth, Wi-Fi, Zigbee, or other wireless transmission interfaces, but the invention is not limited thereto. The signal transmission interface 622 may also be a wired signal transmission interface, such as High Definition Multimedia Interface (HDMI), Mobile High-definition Link (MHL), or other wired transmission interfaces, but the invention is not limited thereto.

It should be noted that, in the embodiment, the arithmetic device 630 may transmit relevant information of the captured image CIMG and the reference region range REFR to the display screen 640. The display screen 640 may serve to display the captured image CIMG and the reference region range REFR. In addition, through the reference region range REFR displayed on the display screen 640, the user may perform an image capturing operation on the imaged image PIMG according to a favorable position and a favorable angle, so as to obtain a favorable captured image CIMG.

It should be noted that, in the embodiments of the invention, the image capturing apparatus 620, the arithmetic device 630, and the display screen 640 may be integrated in the same electronic apparatus, and the electronic apparatus may be a handheld electronic apparatus. Alternatively, the image capturing apparatus 620, the arithmetic device 630, and the display screen 640 may also be respectively disposed in different electronic apparatuses. The display screen 640 is a display, for example.

Figure 7:
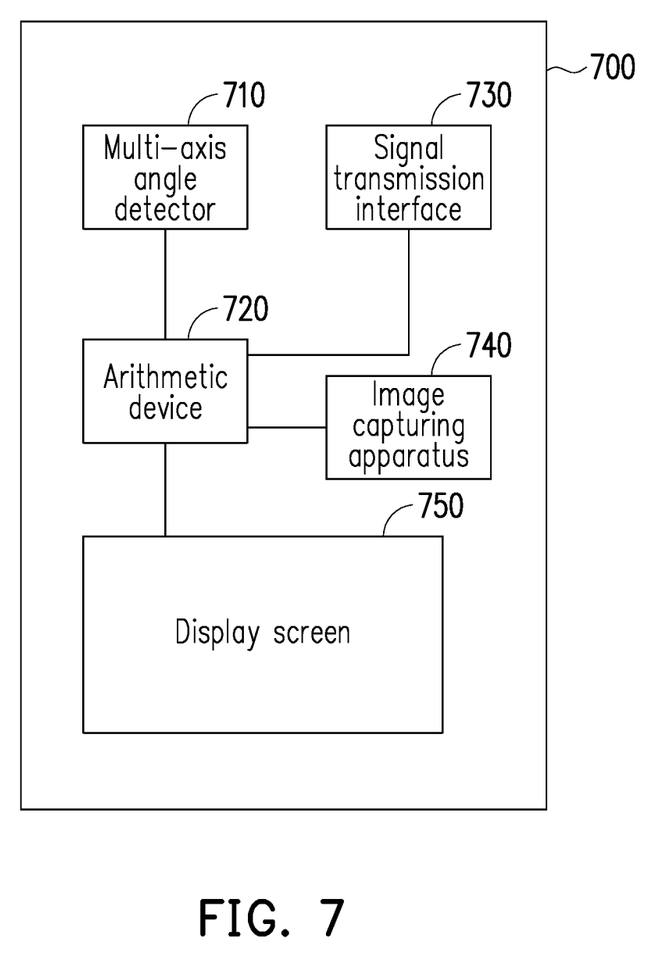
FIG. 7 is a schematic view illustrating an example of a projection system according to an embodiment of the invention.

Referring to FIG. 7, FIG. 7 is a schematic view illustrating an example of a projection system according to an embodiment of the invention. In FIG. 7, an image capturing apparatus 710, an arithmetic device 720, and a display screen 750 are jointly disposed in a handheld electronic apparatus 700. The handheld electronic apparatus 700 further includes a multi-axis angle detector 710 and a signal transmission interface 730.

The arithmetic device 720 is coupled to the multi-axis angle detector 710, the signal transmission interface 730, the image capturing apparatus 740, and the display screen 750. The multi-axis angle detector 710 is configured to detect the static gravity state of the handheld electronic apparatus 700 to generate the multi-axis angle information. The image capturing apparatus 740 is configured to capture the imaged image PIMG to generate the captured image CIMG. The signal transmission interface 730 performs a signal transmission operation with the projection apparatus in a wireless or wired manner. The display screen 750 may be configured to display the captured image CIMG. In the embodiments of the invention, the display screen 750 may also be configured to display the reference region range generated according to the multi-axis angle information.

It should be noted that, in some embodiments of the invention, the reference region range may be omitted and not displayed on the display screen 750.

Figure 8A:
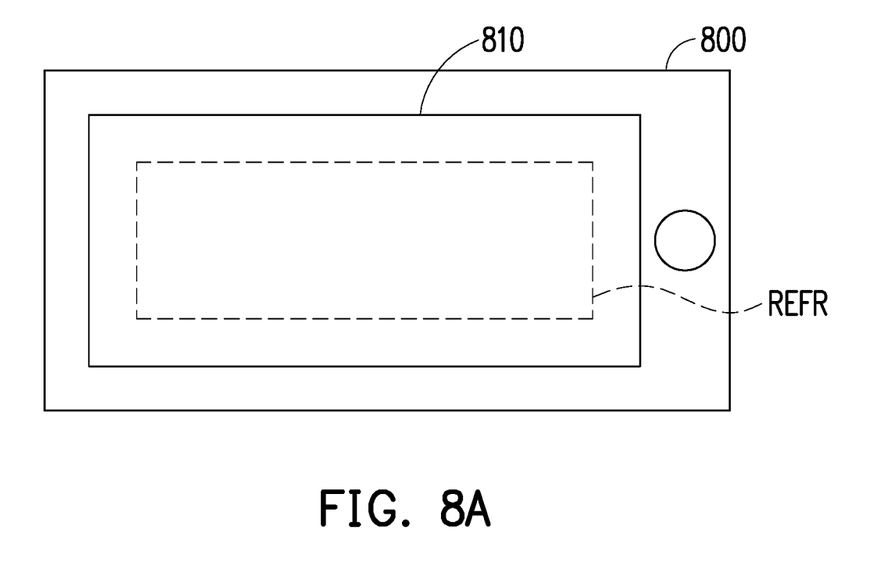
FIGS. 8A and 8B are schematic views illustrating how a reference region range is displayed according to embodiments of the invention.
Figure 8B:
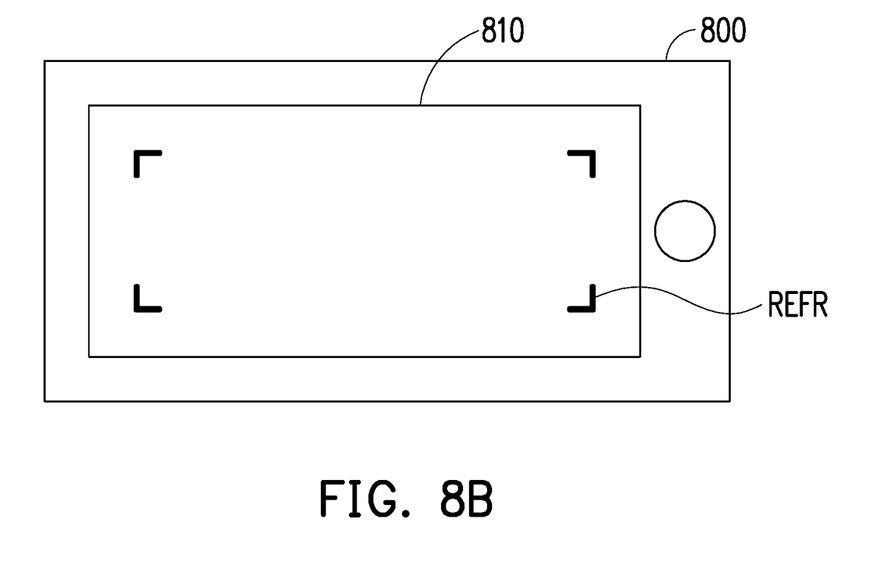

Referring to FIGS. 8A and 8B, FIGS. 8A and 8B are schematic views illustrating how a reference region range is displayed according to embodiments of the invention. In FIG. 8A, a handheld electronic apparatus 800 displays the reference region range REFR through a display screen 810. Specifically, the display screen 810 displays the reference region range REFR as a rectangular frame in a dashed line to serve as the reference for the user to capture the imaged image PIMG and obtain the captured image CIMG. In FIG. 8B, the handheld electronic apparatus 800 displays the reference region area REFR through displaying the four corners, so it is not necessary to display the entire range of the reference region range REFR.

Of course, how the reference region range REFR is displayed as illustrated in FIGS. 8A and 8B merely serves as examples. People having ordinary skill in the art may display the reference region range REFR in other different ways. The invention does not intend to impose a limitation on this regard.

Figure 9:
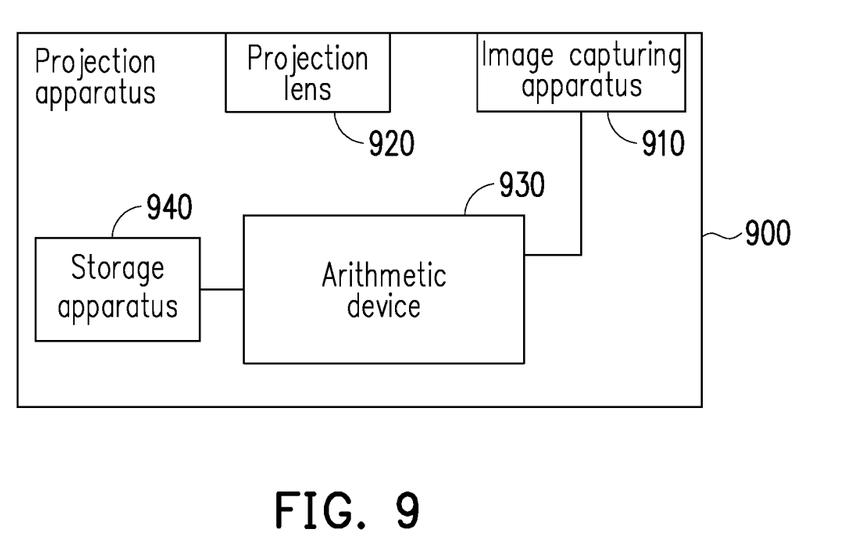
FIG. 9 is a schematic view illustrating a projection apparatus according to an embodiment of the invention.

Referring to FIG. 9, FIG. 9 is a schematic view illustrating a projection apparatus according to an embodiment of the invention. A projection apparatus 900 includes an image capturing apparatus 910, a projection lens 920, an arithmetic device 930, and a storage apparatus 940. The image capturing apparatus 910 is coupled to the arithmetic device 930. The arithmetic device 930 controls the storage apparatus 940 to output a calibration image, and then projects the calibration image through the projection lens 920 to generate the imaged image PIMG. The image capturing apparatus 910 is configured to capture the imaged image PIMG to obtain the captured image CIMG. In addition, the image capturing apparatus 910 may have the multi-axis angle detector configured to detect the multi-axis angle information of the image capturing apparatus 910. The arithmetic device 930 may generate the reference region range according to the multi-axis information. Besides, through the identification patterns in the calibration image and the identification patterns in the captured image CIMG, the arithmetic device 930 may calculate the coordinate conversion information. Then, by calculating the reference coordinate values of the reference region range through the coordinate conversion information, the arithmetic device 930 may calculate the boundary calibration information CCF.

In this way, the projection apparatus 900 may adjust the size of the imaged image PIMG through the projection lens 920 according to the boundary calibration information CCF.

In the embodiment, the image capturing apparatus 910, the projection lens 920, and the arithmetic device 930 are integrated in the same projection apparatus 900. Meanwhile, details concerning generation of the multi-axis angle information, the coordinate conversion information, and the boundary calibration information CCF are similar to those in the examples described in the embodiments described above and therefore will not be repeated in the following.

It should be noted that, in the embodiments of the invention, the projection apparatus 900 and the image capturing apparatus 910 may perform relevant arithmetic operations by using a single arithmetic device 930. Alternatively, the arithmetic device 930 may be implemented as two arithmetic chips respectively corresponding to the projection apparatus 900 and the image capturing apparatus 910.

In view of the foregoing, in the embodiments of the invention, the image capturing apparatus captures the imaged image projected by the projection apparatus according to the calibration image. The coordinate conversion information is calculated by using the identification patterns in the captured image and the identification patterns in the calibration image. In the embodiments of the invention, the reference region range is also generated according to the multi-axis angle information of the image capturing apparatus, and the boundary calibration information is calculated according to the reference region range and the coordinate conversion information. The projection apparatus according to the embodiments of the invention adjusts the size of the imaged image according to the boundary calibration information, so as to complete the calibration operation on the imaged image. In this way, the projection system does not require the projection curtain as the reference and is still capable of effectively completing the calibration operation on the imaged image and facilitating the usage performance of the projection system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A calibration method for a displayed image, suitable for a projection system comprising a projection apparatus, an image capturing apparatus, and an arithmetic device, the calibration method comprising:
    by the projection apparatus, projecting a calibration image, wherein the calibration image comprises at least four identification patterns;
    by the image capturing apparatus, providing multi-axis angle information and capturing a captured image;
    by the arithmetic device, calculating a reference region range in the captured image according to the multi-axis angle information and calculating coordinate conversion information according to the identification patterns in the calibration image and a plurality of identification patterns in the captured image;
    by the arithmetic device, calculating boundary calibration information according to a plurality of reference coordinate values on the reference region range and the coordinate conversion information; and
    by the projection apparatus, adjusting a size of an imaged image according to the boundary calibration information and the coordinate conversion information.

2. The calibration method for the displayed image as claimed in claim 1, further comprising: by the arithmetic device, establishing first coordinate information according to the identification patterns of the calibration image, establishing second coordinate information according to the identification patterns in the captured image, and calculating the coordinate conversion information according to the first coordinate information and the second coordinate information.

3. The calibration method for the displayed image as claimed in claim 2, further comprising: by the arithmetic device, establishing a first coordinate system according to the calibration image and establishing the first coordinate information according to coordinate values of geometric centers of the identification patterns of the calibration image in the first coordinate system.

4. The calibration method for the displayed image as claimed in claim 2, further comprising: by the arithmetic device, establishing a second coordinate system according to the captured image and establishing the second coordinate information according to coordinate values of geometric centers of the identification patterns in the captured image in the second coordinate system.

5. The calibration method for the displayed image as claimed in claim 4, further comprising: by the arithmetic device, calculating the reference coordinate values of a plurality of corners of the reference region range in the second coordinate system and converting the reference coordinate values according to the coordinate conversion information to obtain the boundary calibration information.

6. The calibration method for the displayed image as claimed in claim 5, further comprising: by the projection apparatus, performing a shrinking or enlarging operation on an original size of image data of the imaged image according to the boundary calibration information, so as to obtain adjusted image data, and performing a projecting operation according to the adjusted image data.

7. The calibration method for the displayed image as claimed in claim 1, further comprising: providing a multi-axis angle detector by using the image capturing apparatus, and detecting a static gravity state of the image capturing apparatus by using the multi-axis angle detector, so as to generate the multi-axis angle information.

8. The calibration method for the displayed image as claimed in claim 1, further comprising: by the arithmetic device, adjusting at least one of a position and a size of the reference region range according to positions of the identification patterns in the captured image.

9. The calibration method for the displayed image as claimed in claim 1, wherein the identification patterns are at a plurality of corners of the calibration image.

10. A projection system, comprising:
a projection apparatus, configured to project a calibration image and adjust a size of an imaged image according to boundary calibration information and coordinate conversion information, wherein the calibration image includes at least four identification patterns;
an image capturing apparatus, configured to provide multi-axis angle information and capture a captured image; and
an arithmetic device, coupled to the projection apparatus and the image capturing apparatus, and configured to calculate a reference region range in the captured image according to the multi-axis angle information and calculate the boundary calibration information according to a plurality of reference coordinate values on the reference region range and the coordinate conversion information,
wherein the arithmetic device is configured to calculate the reference region range according to the multi-axis angle information, and
wherein the arithmetic device is configured to calculate the coordinate conversion information according to the identification patterns of the calibration image and a plurality of identification patterns in the captured image.

11. The projection system as claimed in claim 10, wherein the arithmetic device is configured to establish first coordinate information according to the identification patterns of the calibration image, establish second coordinate information according to the identification patterns in the captured image, and calculate the coordinate conversion information according to the first coordinate information and the second coordinate information.

12. The projection system as claimed in claim 11, wherein the arithmetic device is configured to establish a first coordinate system according to the calibration image and establish the first coordinate information according to coordinate values of geometric centers of the identification patterns of the calibration image in the first coordinate system.

13. The projection system as claimed in claim 11, wherein the arithmetic device is configured to establish a second coordinate system according to the captured image and establish the second coordinate information according to coordinate values of geometric centers of the identification patterns in the captured image in the second coordinate system.

14. The projection system as claimed in claim 13, wherein the arithmetic device is configured to calculate the reference coordinate values of a plurality of corners of the reference region range in the second coordinate system and convert the reference coordinate values according to the coordinate conversion information to obtain the boundary calibration information.

15. The projection system as claimed in claim 14, wherein the projection apparatus is configured to perform a shrinking or enlarging operation on an original size of image data of the imaged image according to the boundary calibration information, so as to obtain adjusted image data, and performs a projecting operation according to the adjusted image data.

16. The projection system as claimed in claim 10, wherein the image capturing apparatus comprises a multi-axis angle detector, wherein:
the multi-axis angle detector is configured to detect a static gravity state of the image capturing apparatus,
wherein the projection system is configured to generate the reference region range by further referring to the static gravity state of the image capturing apparatus.

17. The projection system as claimed in claim 10, wherein the arithmetic device is further configured to adjust at least one of a position and a size of the reference region range according to positions of the identification patterns in the captured image.

18. The projection system as claimed in claim 10, wherein the image capturing apparatus further comprises a display screen and a signal transmission interface, wherein:
the display screen is configured to display the reference region range; and
the signal transmission interface is configured to transmit the coordinate conversion information to the projection apparatus.

19. The projection system as claimed in claim 10, wherein the image capturing apparatus and the arithmetic device are disposed in a handheld electronic apparatus.

20. A projection apparatus, comprising an image capturing apparatus and an arithmetic device, wherein:
the image capturing apparatus is configured to provide multi-axis angle information and capture a captured image; and
the arithmetic device is coupled to the image capturing apparatus, and is configured to control a projection lens to project a calibration image and adjust a size of an imaged image according to boundary calibration information and coordinate conversion information,
wherein the calibration image includes at least four identification patterns,
wherein the arithmetic device is configured to calculate the boundary calibration information according to a plurality of reference coordinate values on the reference region range and the coordinate conversion information,
wherein the arithmetic device is configured to calculate the reference region range according to the multi-axis angle information, and
wherein the arithmetic device is configured to calculate the coordinate conversion information according to the identification patterns of the calibration image and a plurality of identification patterns in the captured image.

* * * * *

UNITED STATES PATENT AND TRADEMARK OFFICE
CERTIFICATE OF CORRECTION

| | | |
|---|---|---|
| PATENT NO. | : 11,076,138 B2 | Page 1 of 1 |
| APPLICATION NO. | : 16/872382 | |
| DATED | : July 27, 2021 | |
| INVENTOR(S) | : Je-Fu Cheng et al. | |

It is certified that error appears in the above-identified patent and that said Letters Patent is hereby corrected as shown below:

On the Title Page

Item (71) Applicant: should read, Coretronic Corporation, Hsin-Chu(TW)

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*